3,137,599
POLYSILANE ROCKET PROPELLANTS
Richard W. Alsgaard, Henry N. Beck, and Edwin P. Plueddemann, Midland, Mich., assignors to Dow Corning Corporation, Midland, Mich., a corporation of Michigan
No Drawing. Filed Oct. 25, 1960, Ser. No. 64,953
2 Claims. (Cl. 149—19)

This invention relates to the use of polysilanes as fuels in rocket propellants.

This invention particularly relates to the art of solid propellants. It has long been known that with the presently known rocket propellants liquid fuels deliver more thrust per pound of fuel than solid propellants. On the other hand, it is well known that solid fuels require a simpler vehicle than do the liquid fuels. Thus, the cost of a rocket employing a solid propellant is far less than that requiring a liquid propellant and the reliability of the vehicle employing a solid propellant should be much better.

In spite of the advantages of solid propellants, they have suffered from the defect of relatively poor thrust. Accordingly, it is the primary object of this invention to provide solid rocket fuels giving superior thrust so that some of the advantages of a liquid fuel can be realized with a solid fuel. Other objects and advantages will be apparent from the following description.

This invention relates to a rocket propellant comprising a mixture of from 60–90% by weight of an oxidizer and from 10–40% by weight of a fuel comprising at least 5% by weight based on the weight of the fuel of a polysilane of the formula

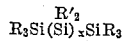

or $(R''_2Si)_y$ in which R is of the group methyl radicals and hydrogen, at least one R per silicon being methyl, $x$ is an integer of at least 1, R' is of the group methyl radicals or hydrogen, R" is of the group methyl radicals or hydrogen, at least one R" per silicon being methyl, and $y$ is an integer of at least 4.

The propellants of this invention are prepared by mixing the oxidizer and the fuel in any desired manner and forming them into the desired shape. For the purpose of this invention the propellant can consist entirely of the oxidizer and one or more of the defined polysilanes. In such a case the polysilane is present in amount of from 10–40% by weight based on the weight of the propellant.

On the other hand the fuel can be composed of one or more of the defined polysilanes in combination with any suitable solid rocket fuel. For example, the fuel can be a mixture of a polysilane and a hydrocarbon polymer such as polybutadiene. When the fuel is a mixture of two or more components, then the polysilane must be present in amount of at least 5% by weight based on the total weight of the fuel.

For the purpose of this invention the physical state of the silane is not critical although it is highly preferable that the silane be in the form of a fluid or waxy, soluble material which can be molded into the desired shape and which, when molded, will bond the oxidizer into a unitary mass. On the other hand, if the silane is in the form of a dry, insoluble powder, it, together with the oxidizer, can be bonded with a suitable fuel such as a hydrocarbon polymer or other organic resin. In such cases the silane may be merely dispersed in the resin bonding matrix or the silane may actually copolymerize with the organic bonding resin.

The most desirable results are obtained when the silane is interacted with an organic resin containing carbon-carbon unsaturation. Thus, for example, one may interact a polysilane with an unsaturated polyester or with an unsaturated hydrocarbon polymer in the presence of a free radical generator such as organic peroxides or under the influence of ionizing radiation or in the presence of a platinum catalyst such as chloroplatinic acid or platinum dispersed on charcoal. Any of these catalysts will, upon the application of heat, cause addition of the SiH groups to the C=C bond, thereby inducing gelation of the mixture and bonding the entire mass, including the oxidizer, into a unitary whole.

It should be understood, of course, that the silane alone can serve as the bonding agent for the oxidizer.

It should be understood that the silanes of this invention can be used to either improve the performance of presently employed solid fuels, such as organic resin polymers, either alone or in admixture with oxidizable metals, such as aluminum, or the silanes can be used alone with the oxidizer to produce superior propellants.

For the purpose of this invention the oxidizer can be any of the standard oxidizing agents employed in solid rocket propellants. Specific examples of such oxidizers are perchlorates such as ammonium perchlorate, lithium perchlorate, sodium perchlorate, magnesium perchlorate, hydrazine perchlorate, or nitronium perchlorate ($NO_2ClO_4$), or nitrates such as ammonium nitrate and the like. The preferred oxidizers are the salts of nitric acid and the salts and coordination complexes of perchloric acid.

Specific examples of polysilanes, which can be employed herein are

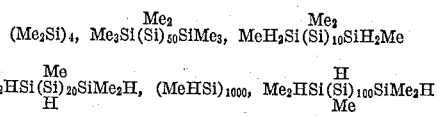

and

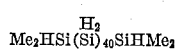

The polysilanes of this invention can be employed with any other solid fuel such as, for example, oxidizable metals such as magnesium, aluminum, or lithium; metal hydrides such as magnesium hydride, lithium aluminum hydride and lithium hydride; hydrocarbons such as polybutadiene and copolymers of polybutadiene and styrene, and other organic resins such as polyurethanes, hydrocarbon polysulphides, polyesters and polyepoxide resins.

Because of the high burning rate of the polysilanes of this invention, they are particularly adaptable for use with metal fuels such as Al. This is true because the polysilane allows optimum amounts of aluminum to be employed.

In addition to the above ingredients, the propellants of this invention can contain minor additives such as catalysts to aid in curing the polysilane or the mixture of polysilane and organic resin. The propellants can also contain adhesives and stabilizers such as are normally employed in rocket propellants.

The abbreviation "Me" is employed herein for the methyl radical.

The following examples are illustrative only and are not to be construed as limiting the invention which is delineated in the appended claims. In the examples all percentages are percent by weight unless otherwise designated.

*Example 1*

A mixture of 20% powdered poly(dimethylsilane) and 80% ammonium perchlorate was pressed into a solid form. The mixture was found to have an impact detonation of 7.6 cm. under a 2 kg. load, a spark ignition of .0067 joule, a heat of explosion of 1545±47 calories per gram and a specific impulse of 257 seconds as measured in a force bomb.

The above properties show that the mixture is a good rocket fuel with respect to energy output but is sensitive to spark and shock.

Example 2

A mixture of 19% powdered poly(dimethylsilane), 5% powdered aluminum and 76% ammonium perchlorate was made and found to have a heat of explosion of 1569±8 calories per gram and a specific impulse of 240 seconds.

Example 3

20% of a thick, liquid polysilane of the formula

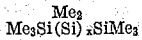

was mixed with 80% ammonium perchlorate. This mixture was much safer to handle than that of Example 1 as shown by the higher impact and greater spark ignition. The mixture had a heat of explosion of 1573±19 calories per gram and a specific impulse of 241 seconds.

Example 4

The polysilane of Example 3 was mixed in amount of 19% with 5% aluminum powder and 76% ammonium perchlorate. The heat of explosion of the mixture was 1052±7 calories per gram and the specific impulse was 225 seconds.

Example 5

A liquid polymer of the unit formula $(MeHSi)_x$ was mixed with a copolymer of 90% polybutadiene and 10% styrene having a viscosity of about 380,000 cs. at 25° C. and a molecular weight of from 8,000 to 10,000. A small amount of di-t-butylperoxide was incorporated in the mixture along with ammonium perchlorate. The mixture was then cast into a cylinder and heated to form a cured unitary mass. The resulting mixture contained 70% ammonium perchlorate, 21% poly(methylhydrogensilane) and 9% polybutadiene. The material had a specific impulse of about 250 seconds.

Example 6

A liquid copolymer consisting of 50 mol percent dimethylsilane units and 50 mol percent methylhydrogensilane units was mixed with ammonium perchlorate in amount of 20% copolymer and 70% perchlorate. The mixture was ignited and found to have a specific impulse of about 250 seconds.

Example 7

A mixture of 20% of a liquid polysilane of the formula

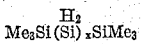

and 80% by weight of ammonium perchlorate was made. The specific impulse of this material showed it to be suitable for use as a rocket propellant.

Example 8

A satisfactory propellant is obtained when 20% by weight of a liquid polysilane of the formula

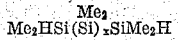

is mixed with 80% by weight of the following oxidizers: hydrazine perchlorate, nitronium perchlorate, and ammonium nitrate.

That which is claimed is:

1. As a rocket propellant, a mixture of from (1) 60–90% by weight of a solid inorganic oxidizer selected from the group consisting of solid inorganic salts and solid coordination complexes of perchloric acid, and (2) from 10–40% by weight of a fuel comprising at least a major proportion by weight based on the weight of (2) of a polysilane selected from the group consisting of silanes of the formula

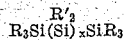

and $(R''_2Si)_y$, in which R, R', and R'' are each selected from the group consisting of the methyl radical and hydrogen, at least one R and one R'' per silicon being methyl, $x$ is an integer of at least one, and $y$ is an integer of at least 4, any remaining fuel being selected from the group consisting of oxidizable metals, oxidizable metal hydrides and organic resin polymers.

2. As a rocket propellant, a mixture consisting essentially of from 60–90% by weight of a solid inorganic oxidizer selected from the group consisting of solid inorganic salts and solid coordination complexes of perchloric acid and from 10–40% by weight of a polysilane selected from the groups consisting of silanes of the formula

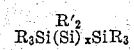

and $(R''_2Si)_y$ in which R, R', and R'' are each selected from the group consisting of the methyl radical and hydrogen, at least one R and R'' per silicon being methyl, $x$ is an integer of at least one, and $y$ is an integer of at least 4.

References Cited in the file of this patent

UNITED STATES PATENTS

| | | |
|---|---|---|
| 2,554,193 | Hunter | May 22, 1951 |
| 2,612,458 | Stedman | Sept. 30, 1952 |
| 2,777,772 | Stedman | Jan. 15, 1957 |
| 2,923,633 | Stedman | Feb. 2, 1960 |
| 2,949,352 | Cramer | Aug. 16, 1960 |